United States Patent Office 3,060,560
Patented Oct. 30, 1962

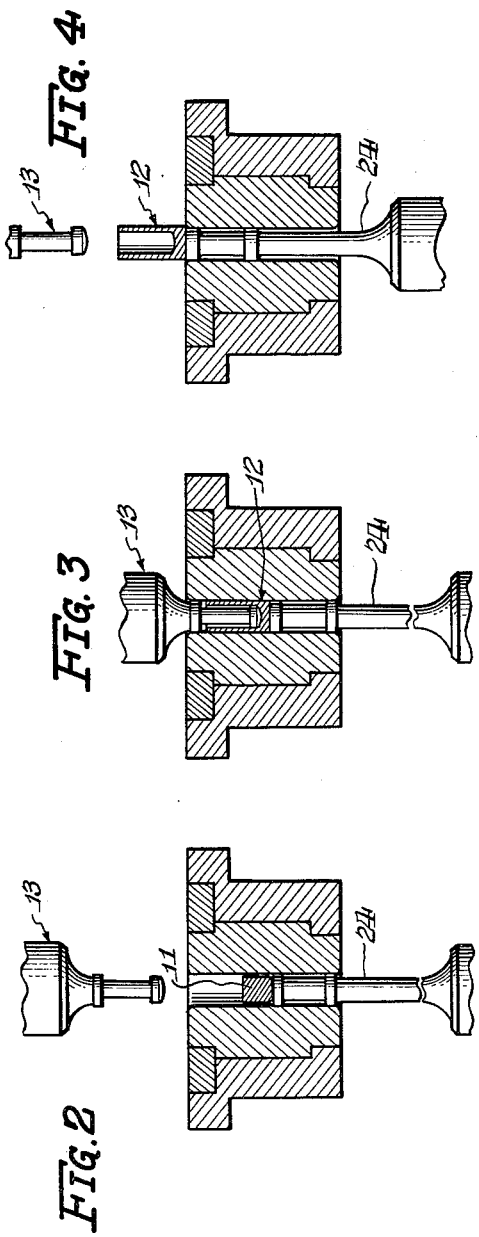

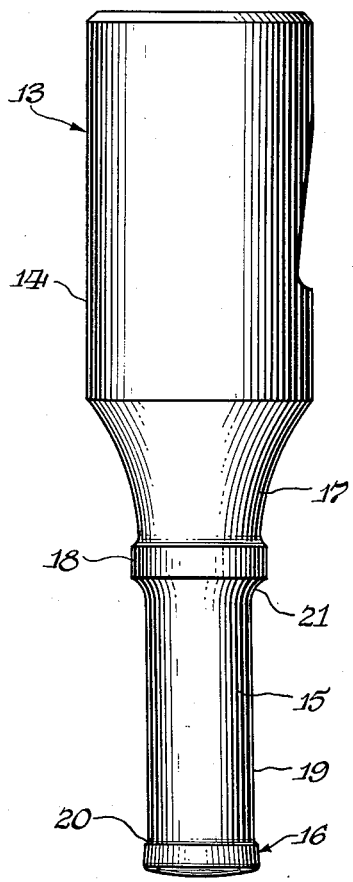
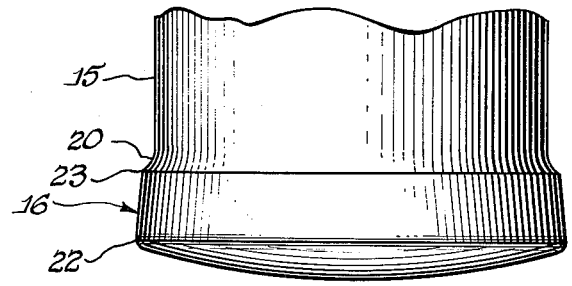
FIG. 5
FIG. 6

3,060,560
METHOD FOR COLD EXTRUDING HIGH DENSITY ARTICLES FROM FERROUS METAL POWDER
Harold R. Biehl, Lake Villa, and David T. Smith, Chicago, Ill., assignors to International Harvester Company, Chicago, Ill., a corporation of New Jersey
Filed Jan. 12, 1959, Ser. No. 786,393
5 Claims. (Cl. 29—420.5)

This invention relates to extruding sintered ferrous powder metal compacts into high density articles. More in particular this invention relates to a method of cold extruding lubricated sintered ferrous powder metal compacts into articles of substantially uniform high density.

Methods for producing high density articles from sintered ferrous powder metal compacts by stepwise or successive pressing operations have long been known. However, in such methods the articles must be formed under pressure with or without heat in order to obtain the higher densities. This of course is objectionable because of excessive cost. The problem therefore is to provide means for forming uniform high density articles from sintered ferrous powder metal compacts at substantially reduced cost as compared with methods heretofore known. To our knowledge cold extrusion of ferrous metal powder compacts to high density as particularly revealed herein has not been accomplished prior to our invention. The primary difficulty in such cold extrusion lies in the fact that since both the compact and the dies are constructed of ferrous metals the necessary pressures required to extrude the compact cold results in seizure of the compact metal and the die metal thus "scoring" the die. This undesirable result does not occur when compacts or pellets of soft metal compositions (e.g. aluminum alloys) are extruded cold for obvious reasons.

Cold extrusion of properly lubricated sintered ferrous powder metal compacts has the advantage of producing substantially uniform high density ferrous articles in but a single stroke operation without undesirable damage or scoring of the extruding dies and punches therefor. Extrusion also greatly improves the mechanical properties of the material. A minor annealing treatment of the extruded article will retain most of the improved properties and also results in good ductility. Such extruded articles have utility in manufacturing at reduced cost, for example, bearings, bushings, valve guides and the like as components of internal combustion engines.

It is therefore a prime object of this invention to provide a method for cold extruding sintered ferrous metal powder lubricated compacts into articles of manufacture having properties substantially equivalent to wrought iron.

It is a further object of this invention to provide a method for cold extruding an article of manufacture of substantially uniform high density from sintered ferrous powder metal compacts wherein the article produced is not frangible or friable.

A still further object of this invention is to provide a method for cold extruding a finished article of manufacture of substantially uniform high density from sintered powder metal compacts without injury to the extrusion dies and punches therefor.

A yet further object of this invention is to provide a method for making an article of manufacture from sintered powder metal compacts by cold extrusion thereof at a substantially reduced cost.

These and other desirable and important objects inherent in and encompassed by the invention will be more readily understood from the ensuing description, the appended claims and the annexed drawings wherein:

FIGURE 1 is a chart illustrating dimensional and test data of materials and a particular example of an article of manufacture in section produced according to this invention.

FIGURE 2 illustrates in cross-section a closed extrusion die having a sintered ferrous powder metal compact inserted therein prior to the extruding stroke of the punch.

FIGURE 3 is similar to FIGURE 2 except that the compact has been extruded into the article shown in FIGURE 1 but the punch has not been retracted.

FIGURE 4 is similar to FIGURES 2 and 3 except that the punch has been withdrawn and the extruded article exemplified by FIG. 1, has been ejected from the die.

FIGURE 5 illustrates enlarged and in detail the profile or contour of the punch employed as shown in FIGURES 2, 3 and 4.

FIGURE 6 illustrates, enlarged and in detail, the profile or contour of the nose portion of the punch shown in FIGURE 5.

In the prior art manufacture of articles by pressing operations it is standard procedure to first form a compact of iron powder by an operation known as briquetting. Briquetting essentially consists of filling a die cavity with powdered metal, such as sponge iron, and compressing the powder in the die into a compact. Generally a small amount of a lubricant is added to the powder prior to its introduction into the die. The compressing operation in the die forces the metal powder particles into close association with one another thereby causing the compact to be of a self-sustaining shape upon ejection therefrom. The compact is then sintered under known procedures. The sintering treatment generally removes the lubricant which might have been added to the powder. The conventional sintered compact is usually close to the shape of the final product desired. The sintered compact thus formed is then pressed under high pressures, often with heat, in successive stages to increase the density of the sintered metal and to form the final product through progressive or step-wise deformation of the compact.

Our invention contemplates the extrusion as distinct from step-wise pressing of a sintered ferrous powder metal compact in pellet form. The powdered ferrous metal particles employed should be of about the size of 100 mesh or finer. Further the iron powder preferably is of essentially ferrite structure and of composition by weight in accordance with the following:

| | | |
|---|---|---|
| Total iron | percent min | 98.0 |
| Carbon | percent | 0.002–0.2 |
| Manganese | do | 0.10–0.35 |
| Acid insolubles | do | 0.05–0.35 |
| Sulfur | do | 0.005–0.025 |
| Phosphorus | do | 0.005–0.040 |
| Residuals | percent max | 1.738 |

Sponge iron, iron powder produced from reduced iron oxide, or any other iron powder essentially of ferrite structure which meets the above stated requirements is suitable for use in this invention. The essential requirement of the iron particle is that it be of ductile character so that it can be deformed or flowed cold under the influence of pressure.

Preferably the sintered pellet, sometimes referred to as a "slug," should be generally cylindrically shaped and provided with a small chamfer or tapered portion on the lower end thereof for reasons which will become apparent later in this specification. Also for purpose of inhibiting or preventing frangibility of the extruded article it is preferable that the top surface of the sintered compact be smooth and the plane thereof be normal with respect to the cylindrical surface thereof. After the conventional sintering operation a suitable lubricant is applied to the surfaces thereof. Zinc stearate has been found to be a satisfactory lubricant for this purpose. The lubricant employed should possess a high film strength property which can withstand extreme pressure without rupture of the lubricant film. It should be observed that due to the porous character of the sintered pellet, the lubricant will creep or penetrate below the apparent outer surface at least to some extent. The pellet is then ready for the cold extrusion operation.

The construction of the extrusion die may be of conventional design and should be made of hard steel. A hardness of the steel testing 66 on the "C" scale of a conventional Rockwell hardness tester was found to be satisfactory. A closed type of extrusion punch and die having an upper movable hard steel punch member and a lower movable hard steel ejector element is preferable. However, the contour or profile of the punch member should preferably be provided with certain characteristics. First, the lower or nose portion of the punch member should be provided with a small conical shaped taper, the lowest point being at the axis and radiating upwardly at a small angle therefrom. The outer or peripheral edge of the nose is provided preferably with a small frusto-conical portion extending upwardly and inwardly. The purpose of shaping the nose thusly is to direct the pressure exerted by the punch on the pellet in an outward direction as well as a downwardly direction so that the flow or deformation of the pellet is concentrated on the internal portion of the pellet while minimizing the flow or movement of metal near the lubricated surface portion of the pellet. This facilitates flowing lubricated metal along the surface of the punch nose and the die cavity to prevent scoring the surfaces of the tools. Second, it is preferable to provide the punch member with a circumferential groove or recessed portion on the shank thereof extending from the upper end of the nose portion upwardly to a point slightly above the upper limit of the extruded article when the punch member has been advanced to its limit in the die. The upper peripheral edge of the groove should preferably be provided with a fillet which tends to inhibit the upper edge of the extruded article from being frangible.

In accordance with the above general principles we have successfully extruded sintered ferrous metal powder compacts into finished articles of manufacture having no frangible portions and having an average density of about 94% theoretical, the density only varying from a minimum of about 93% to a maximum density of about 98% within the part.

We now for illustrative purpose describe in detail a specific example of the invention wherein a finished cup-shaped article of manufacture of a height of 1.62 inches, outer diameter of 1.03 inches, wall thickness of 0.09 inch, and an internal depth of 1.38 inches was made by cold extrusion of a lubricated sintered ferrous metal powder pellet in accordance with this invention.

Commercial sponge iron particles having a particle size meeting the requirements for 100 mesh grade was employed. The iron was essentially ferrite in character and its chemical analysis was found to be as follows:

| | Percent |
|---|---|
| Total iron | 99 |
| Carbon | 0.06 |
| Manganese | 0.10 |
| Acid insolubles | 0.33 |
| Sulfur | 0.010 |
| Phosphorus | 0.010 |
| Residuals | 0.490 |

A 100 pound lot of the above described iron powder was placed in a conventional drum type blending apparatus which rotates about 40 revolutions per minute. To this lot was added one pound of the above mentioned modified fatty acid esters known as grade C Acrawax. (Other experiments showed that powdered zinc stearate of about 325 mesh or finer gave satisfactory results too.) The blender was operated for one hour to make certain that each particle of iron powder was coated with a film of the lubricant. The blending operation was performed at room temperature, that is to say, no heat was applied. The apparent density of the resulting lubricated iron particles was found to be about 2.5 grams per cubic centimeter as compared to solid iron having a density of about 7.85 grams per cubic centimeter.

A hard steel die having a 1" diameter cavity was used for briquetting the powder. One of the briquetting punches was designed to form a plane surface on the top slug face square with respect to the cylindrical axis thereof. The other punch was designed to form a small chamfer or taper peripherally around the bottom plane surface of the slug. The chamfer was about 30° resulting in that the depth of the tapered portion of the slug was about 0.09 inch as illustrated in FIGURE 1.

A measured portion of the lubricated iron powder was taken from the blender and poured into the briquetting die cavity to a depth of about 2.5 inches and weighing about 80 grams. This column of lubricated powdered metal is illustrated at 10 on FIGURE 1 of the drawings. Pressure was applied at room temperature to the column 10 in the briquetting die in the order of about 75,000 pounds per square inch. The briquette or compact thus formed and removed from the die measured about 1 inch high and retained its shape after ejection from the briquetting die. The briquette thus formed was then sintered in a conventional manner to bond the particles of iron together. This consisted of heating the briquette to a temperature of about 2050° F. for about one hour in a furnace with a reducing atmosphere. The reducing atmosphere contained an appreciable amount of hydrogen produced by a commercial gas generating apparatus which catalytically cracks commercial natural gas to deliver a product containing sufficient hydrogen for the purpose of providing the referred to reducing atmosphere.

The resulting sintered compact was cooled to room temperature in a reducing atmosphere of the same type previously described. The cooled sintered compact was clean and of a bright luster. Several additional sintered compacts were prepared in the same way, one of which is illustrated at 11 in FIGURE 1. As indicated in FIGURE 1 these sintered compacts or pellets possessed a density of about 6.2 grams per cubic centimeter and had a hardness value of about 70 as measured on the conventional Rockwell testing apparatus on the "H" scale. The pellets also possessed a strength factor of about 45,000 pounds per square inch (K factor) as measured in accordance with the procedure specified by American Society for Testing Materials designation B–202–55T. The next step was to lubricate the surfaces of the sintered compacts or pellets. This was accomplished as follows:

A closable container having a volume equivalent to about one U.S. gallon was half-filled with ten to twenty mesh steel grit. About one-half pound of powdered zinc stearate, about 325 mesh or finer, was added to the steel grit and the aggregate tumbled for several minutes sufficiently to smoothly coat the grit with the soap. Several of the sintered compacts or pellets previously described were then added to the container and the entire aggregate tumbled for about four minutes resulting in a smoothe coating of zinc stearate on the sintered compacts. At this point it should be noted that some of the sintered compacts were phosphatized by conventional methods instead of tumbling with zinc stearate. For example a phosphatizing solution containing zinc was found to be satisfactory. Phosphatizing has the advantage of penetrating to some extent below the apparent surface of the sintered compact. Phosphatized sintered compacts were also extruded in accordance with this invention with excellent results. Numerous other lubricants may obviously be employed instead of zinc stearate. The lubricated sintered compacts or pellets prepared thusly were then extruded at room temperature, that is to say, no external heat was applied.

At this point we discuss the more important aspects of the apparatus employed to extrude the sintered compacts described above. Reference is made to FIGURES 5 and 6 of the drawings illustrating the construction characteristics of the movable punch member generally indicated at 13. The punch member 13 comprises a conventional head portion 14 and a shank 15. The lower end portion of the shank 15 is provided with a nose generally indicated at 16. The upper end of the shank 15 is conventionally integral with the head 14 by the tapered section 17 with a collar portion 18. The radius of the collar 18 is slightly less than the diameter of the bore or cavity in the die so that the punch 13 is slidable in the die cavity.

The shank 15 is provided with a circumferential groove 19 extending longitudinally from the nose 16 to the collar 18 and is preferably provided with fillets 20 and 21. The purpose of the groove 19 is to remove unnecessary contact of the extruding metal with the punch 13. In the particular punch 13 used to illustrate the specific example described, the fillets 20 and 21 possessed a mean radius of 0.12 inch and the collar 18 of a mean diameter of 1.0297 inches. The mean diameter of the bore in the die cavity was 1.030 inches. The mean diameter of the nose 16 of the punch 13 taken at 22 (FIG. 6) was about 0.850 inch. The nose 16 was also provided with a slight taper, about 1° between points 22 and 23 (FIG. 6) with respect to the vertical. This taper was provided for the purpose of minimizing contact of extruding metal with the punch 13 similar to that described for groove 19.

Referring now to FIG. 2, the sintered powdered metal lubricated compact prepared as described above was inserted as shown, the chamfered portion downward.

The punch 13 was then actuated downwardly into the die cavity employing a force of the order of about 300,000 pounds per square inch which extruded the article 12 in the die as illustrated in FIG. 3. The punch 13 was then withdrawn and the ejector 24 actuated upwardly to eject the article 12 from the die as shown in FIG. 4. The article 12 was then measured as illustrated in FIG. 1 and found to possess a hardness of 98 as measured on B scale of a conventional Rockwell tester, a mean density of 7.40 grams per cubic centimeter and a strength factor of 175,000 pounds per square inch.

Repeated extrusion operations similar to that described above were made with the same punch and die without evidence of scoring of the punch or die surfaces.

Some of the articles 12 thus made were annealed for 10 minutes at 1000° F. and were reduced in hardness to a value of about 55 as measured on the B scale of the Rockwell tester and the strength factor was reduced to about 124,000 pounds per square inch as illustrated at 12a of FIG. 1. Additional articles 12 were annealed at 1600° F. for 10 minutes resulting in a hardness of about 40 as measured on the B scale of the Rockwell tester and a strength factor of about 90,000 pounds per square inch as shown at 12b of FIG. 1. As previously mentioned these strength factors were determined in accordance with the procedure described in American Society for Testing Materials designation B-202-55T. None of the articles 12, 12a and 12b was found to be frangible particularly with respect to the upper portion thereof.

From FIG. 1 it will be seen that the specific density of the article 12b was measured at four points to determine the variation in density from the mean density of 7.40 grams per cubic centimeter (94% of theoretical maximum density). In terms of percent maximum theoretical density the variation of density was found to range from 93 to 98 percent.

We now discuss some of the theoretical as well as practical aspects of our invention. In the preparation of the lubricated compact 11, the penetration of the lubricant employed below the apparent surface is relatively of low order. Where the compact 11 is phosphatized for lubrication, the penetration is somewhat more deep as might be expected. This being the case it is necessary that the design of punch 13 must be carefully considered. It is important that none of the material of the compact 11, except the lubricated surfaces, engage either the punch 13 or the cavity walls of the associated die member. Thus the outer surfaces 25 and 26 must be the same lubricated surface material of the compact 11. The contour of the nose 16 is adapted to transmit force not only downwardly but radially outward to flow the metal of the compact upwardly thus presenting only the lubricated surfaces to the die cavity wall. The lubricated top surface of the compact engages the nose 16 to protect it from scoring. The lower taper of the compact 11 provides an increased amount of lubricated surface which permits a limited amount of downward flow of metal in an outward direction to form the surface 26 of the article 12. The circumferential groove 19 on the punch 13 allows flow of metal from the compact 11 upwardly without lubricant forming the surface 28 of the article 12 while avoiding contact with the punch 13. The fillet 21 on the shank 15 serves to compress the flowing metal together upon reaching the fillet which further tends to inhibit any frangibility of the upper portion of the article 12. From these considerations it becomes apparent that in order to extrude ferrous metal articles from sintered ferrous metal powder compacts it is necessary to not only prepare the compacts as described but also that some modifications of the punch member of the extrusion die are required as compared with conventional practice of extruding soft pellets.

Other hollow or tubular shaped articles from that described above may obviously be extruded from sintered ferrous metal powder compacts prepared in a similar manner except for size. It appears from our experiments that where the ratio of length to the outer diameter of the article did not exceed 4 to 1, good results were obtained provided that the ratio of length to wall thickness did not exceed 16 to 1.

Having thus described an embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A method for making a ferrous metal article of manufacture of high density characteristics from a low density sintered powdered ferrous metal compact by extrusion in a die comprising a hard metal cavity-containing stationary element having an upwardly movable ejector element in said cavity and a punch member advanceable into said cavity, said punch member having a nose disposed on the lower portion thereof and a shank portion disposed above said nose, said nose being tapered on the lower surface thereof, said shank portion having a peripherally disposed recess extending upwardly from said nose, said method consisting of the steps of preparing said low density sintered compact from powdered ferrous metal particles, said ferrous metal particles being of substantially ferrite structure, said compact having a width at least equal to its height, coating the external surfaces of said sintered compact with a high film strength lubricant, inserting said lubricated sintered compact into said cavity of said die at ambient temperature, advancing said punch member into engagement once with said lubricated sintered compact with a force of sufficient magnitude to extrude and greatly increase the density of said lubricated sintered compact in said die to form said article of high density characteristics, retracting said punch member and thereafter ejecting said article from said die, said article having a height substantially greater than its width and at least one wall of a thickness at least one-sixteenth of said height.

2. A method for making a ferrous metal article of manufacture of high density characteristics from a low density sintered powdered ferrous metal compact by extrusion in a die comprising a hard steel cavity-containing stationary element having an upwardly movable ejector element in said cavity and a hard steel punch member advanceable into said cavity, said punch member having a nose disposed on the lower portion and a shank portion disposed above said nose, said nose being tapered on the lower surface thereof, said shank portion having a peripherally disposed recess extending upwardly from said nose, said method consisting of the steps of preparing a low density sintered compact from finely powdered ferrous metal particles of 100 mesh and finer in size, said ferrous metal particles being of substantially ferrite structure, said compact having a width at least equal to its height, coating the external surfaces of said sintered compact with a high film strength lubricant, inserting said lubricated sintered compact into said cavity of said die at ambient temperature, advancing said punch member into engagement once with said lubricated sintered compact with a force of sufficient magnitude to extrude and greatly increase the density of said compact in said die to form said article of high density characteristics without application of an external source of heat, retracting said punch member and thereafter actuating said ejector element for ejecting said article from said die, said article having a height substantially greater than its width and at least one wall of a thickness at least one-sixteenth of said height.

3. A method for making a ferrous metal article of manufacture of high density characteristics from a low density sintered powdered ferrous metal compact by extrusion in a die comprising a hard steel cavity-containing stationary element having an upwardly movable ejector element in said cavity and a hard steel punch member advanceable into said cavity, said punch member having a nose disposed on the lower portion and a shank portion disposed above said nose, said nose being tapered inwardly and downwardly on the lower surface thereof, said shank portion having a peripherally disposed recess extending upwardly from said nose, said shank portion of said punch member having a peripherally disposed fillet adjacent the upper end of said recess, said method consisting of the steps of preparing a low density sintered compact from finely powdered ferrous metal particles of 100 mesh and finer in size, said ferrous metal particles being of substantially of ferrite structure having a composition consisting of from about 0.002 to 0.2 percent by weight of carbon, from about 0.10 to 0.35 percent by weight of manganese, from about 0.05 to 0.35 percent by weight of acid insolubles, from about 0.005 to 0.025 percent by weight of sulfur, from about 0.005 to 0.040 percent by weight of phosphorus, at least about 98.0 percent by weight of iron, and not more than about 1.738 percent by weight of other impurities, said compact having a width at least equal to its height, coating the external surfaces of said sintered compact with a high film strength lubricant, inserting said lubricated sintered compact into said cavity of said die at ambient temperature, advancing said punch member into engagement once with said lubricated sintered compact with a force of sufficient magnitude to extrude and greatly increase the density of said compact in said die to form said article of high density characteristics without application of an external source of heat, retracting said punch member and thereafter actuating said ejector element for ejecting said article from said die, said article having a height substantially greater than its width and at least one wall of a thickness at least one-sixteenth of said height.

4. A method for making a high density ferrous metal article of manufacture having a substantially uniform density exceeding 90 percent theoretical maximum density from a low density sintered powdered ferrous metal compact by extrusion in a die comprising a hard steel cavity-containing stationary element heaving an upwardly movable ejector element and a hard steel punch member advanceable into said cavity, said punch member having a nose disposed on the lower portion and a shank portion disposed above said nose, said nose being tapered inwardly and downwardly on the lower surface thereof, said nose having a frusto-conical portion disposed on the outer periphery extending upwardly and inwardly thereof, said shank portion having a peripherally disposed recess extending upwardly from said nose, said shank portion of said punch member having a peripherally disposed fillet adjacent the upper end of said recess, said method consisting of the steps of compressing finely powdered ferrous metal particles of 100 mesh and finer in size to form a low density composition of matter, said ferrous metal particles being substantially of ferrite structure having a composition consisting of from about 0.002 to 0.2 percent by weight of carbon, from about 0.10 to 0.35 percent by weight of manganese, from about 0.05 to 0.35 percent by weight of acid insolubles, from about 0.005 to 0.025 percent by weight of sulfur, from about 0.005 to 0.40 percent by weight of phosphorus, at least about 98.0 percent by weight of iron, and not more than about 1.738 percent by weight of other impurities, said compact having a width at least equal to its height, sintering said compressed composition of matter at a temperature of about 2050° F. for about one hour in the presence of a non-oxidizing atmosphere to form a sintered compact, cooling said sintered compact in said non-oxidizing atmosphere to ambient temperature, coating said compact with a lubricant having high film strength characteristics, inserting said lubricated sintered compact into said cavity of said die at ambient temperature, advancing said punch member into engagement once with said lubricated sintered compact with a force of sufficient magnitude to extrude and simultaneously increase the density above 90 percent of maximum density of said compact whereby said ferrite metal flows outwardly and upwardly into engagement with said fillet of said punch member and conforming with said cavity to form said article without application of an external source of heat, retracting said punch member and thereafter actuating said ejector element for ejecting said article of substantially uniform high density from said die, said article having a height substantially greater than its width and at least one wall of a thickness at least one-sixteenth of said height.

5. A method for making a high density ferrous metal article of manufacture having a substantially uniform density of at least 90% theoretical maximum density from a low density sintered powdered ferrous metal compact by extrusion in a die comprising a hard steel cavity-containing stationary element having an upwardly movable ejector element and a hard steel punch member advanceable into said cavity, said punch member having a nose disposed on the lower portion and a shank portion disposed above said nose, said nose being tapered inwardly and downwardly on the lower surface thereof, said nose having a frusto-conical portion disposed on the outer periphery extending upwardly and inwardly thereof, said shank portion having a peripherally disposed recess extending upwardly from said nose, said shank portion of said punch member having a peripherally disposed fillet adjacent the upper end of said recess, said method consisting of the steps of compressing finely powdered ferrous metal particles of 100 mesh and finer in size to form a low density composition of matter, said ferrous metal particles being substantially of ferrite structure having a composition consisting of about 0.06 percent by weight of carbon, about 0.10 percent by weight of manganese, about 0.33 percent by weight of acid insolubles, about 0.01 percent by weight of sulfur, about 0.010 percent by weight of phosphorus, about 99 percent by weight of iron, and about 0.490 percent by weight of other impurities, said compact having a width at least equal to its height, sintering said compressed composition of matter at a temperature of about 2050° F. for about one hour in the presence of a reducing atmosphere to form a sintered compact, cooling said sintered compact in said reducing atmosphere to ambient temperature, coating said compact with a lubricant having high film strength characteristics, inserting said lubricated sintered compact into said cavity of said die at ambient temperature, advancing said punch member into engagement once with said lubricated sintered compact with a force of sufficient magnitude to extrude and simultaneously increase the density above 90 percent of maximum density of said compact whereby said ferrite metal flows outwardly and upwardly into engagement with said fillet of said punch member and conforming with said cavity to form said article without application of an external source of heat, retracting said punch member and thereafter actuating said ejector element for ejecting said high density article from said die, said article having a height substantially greater than its width and at least one wall of a thickness at least one-sixteenth of said height.

References Cited in the file of this patent

UNITED STATES PATENTS

| | | |
|---|---|---|
| 2,001,134 | Hardy | May 14, 1935 |
| 2,008,939 | Tufts | July 23, 1935 |
| 2,148,040 | Schwarzkopf | Feb. 21, 1939 |
| 2,489,838 | Webb | Nov. 29, 1949 |
| 2,540,457 | Rice | Feb. 6, 1951 |
| 2,665,981 | Marquaire | Jan. 12, 1954 |
| 2,748,464 | Kaul | June 5, 1956 |

OTHER REFERENCES

"Materials and Methods," August 1955, Reinhold Publishing Corp, 430 Park Avenue, New York 22, N.Y.; "Impact (Cold) Extruded Parts," by John L. Everhart, pp. 111–126 relied on.